United States Patent
Tung et al.

(10) Patent No.: US 9,079,384 B2
(45) Date of Patent: Jul. 14, 2015

(54) TOUCH SENSOR PANEL HAVING AN INDEX MATCHING PASSIVATION LAYER

(75) Inventors: Chun-Hao Tung, Taipei (TW); EnkhAmgalan Dorjgotov, San Francisco, CA (US); Masato Kuwabara, Tokyo (JP); Sunggu Kang, San Jose, CA (US); Cheng Chen, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 13/371,359

(22) Filed: Feb. 10, 2012

(65) Prior Publication Data

US 2013/0120283 A1    May 16, 2013

Related U.S. Application Data

(60) Provisional application No. 61/558,840, filed on Nov. 11, 2011.

(51) Int. Cl.
*G06F 3/041* (2006.01)
*B32B 37/14* (2006.01)
*B32B 37/12* (2006.01)

(52) U.S. Cl.
CPC .............. *B32B 37/12* (2013.01); *G06F 3/041* (2013.01); *B32B 2457/208* (2013.01); *Y10T 156/10* (2015.01)

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 5,973,760 A | 10/1999 | Dehmlow | |
| 6,188,391 B1 | 2/2001 | Seely et al. | |
| 6,310,610 B1 | 10/2001 | Beaton et al. | |
| 6,323,846 B1 | 11/2001 | Westerman et al. | |

(Continued)

FOREIGN PATENT DOCUMENTS

| | | |
|---|---|---|
| JP | 2000-163031 A | 6/2000 |
| JP | 2002-342033 A | 11/2002 |
| KR | 20110029531 A | 3/2011 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Jonathan Horner
*Assistant Examiner* — Douglas M Wilson
(74) *Attorney, Agent, or Firm* — Morrison & Foerster LLP

(57) ABSTRACT

Touch sensor panels typically include a plurality of layers that can be stacked on top of each other. When the touch sensor panel is used in a bright environment, incident light can hit the interfaces between those layers of the stackup having mismatched refractive indices and can reflect off those interfaces. The light reflected from those interfaces can give rise to the appearance of fringes on the touch sensor panel, which can be visually distracting. In order to reduce the appearance of these fringes, embodiments of the disclosure are directed to the addition of an index matching passivation layer between a conductive layer of traces and an adhesive layer in the touch sensor panel stackup.

23 Claims, 6 Drawing Sheets

(56) References Cited

U.S. PATENT DOCUMENTS

| | | |
|---|---|---|
| 6,690,387 B2 | 2/2004 | Zimmerman et al. |
| 6,720,955 B2 * | 4/2004 | Sugawara et al. ............. 345/173 |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 2006/0026521 A1 | 2/2006 | Hotelling et al. |
| 2006/0197753 A1 | 9/2006 | Hotelling |
| 2008/0158183 A1 * | 7/2008 | Hotelling et al. ............. 345/173 |
| 2009/0315844 A1 | 12/2009 | Saito et al. |
| 2010/0141608 A1 * | 6/2010 | Huang et al. .................. 345/178 |
| 2010/0148204 A1 | 6/2010 | Ikeda et al. |
| 2010/0208158 A1 | 8/2010 | Chen et al. |
| 2010/0265187 A1 * | 10/2010 | Chang et al. .................. 345/173 |
| 2011/0030778 A1 | 2/2011 | Takacs et al. |
| 2011/0234507 A1 * | 9/2011 | Chou et al. .................... 345/173 |
| 2013/0021303 A1 * | 1/2013 | Martin et al. ................. 345/178 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

TOUCH SENSOR PANEL HAVING AN INDEX MATCHING PASSIVATION LAYER

CROSS-REFERENCE TO RELATED APPLICATIONS

This application claims the benefit, under 35 U.S.C. §119 (e), of U.S. Provisional Patent Application No. 61/558,840, filed Nov. 11, 2011, and entitled "Touch Sensor Panel Having An Index Matching Passivation Layer," the contents of which are incorporated by reference herein in their entirety for all purposes.

FIELD OF THE DISCLOSURE

This relates generally to a touch sensor panel and, more particularly, to the construction of a touch sensor panel having an index matching passivation layer that reduces the appearance of fringes on the touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels typically include a plurality of layers that can be stacked on top of each other. This stackup can include a matrix of drive lines and sense lines formed of a substantially transparent conductive material, such as Indium Tin Oxide (ITO), and a substrate disposed between the drive and sense lines. When the touch sensor panel is used in a bright environment, incident light can hit the interfaces between those layers of the stackup having mismatched refractive indices and can reflect off those interfaces. The light reflected from those interfaces can give rise to the appearance of fringes on the touch sensor panel, which can be visually distracting.

SUMMARY

Touch sensor panels typically include a plurality of layers that can be stacked on top of each other. When the touch sensor panel is used in a bright environment, incident light can hit the interfaces between those layers of the stackup having mismatched refractive indices and can reflect off those interfaces. The light reflected from those interfaces can give rise to the appearance of fringes on the touch sensor panel, which can be visually distracting. In order to reduce the appearance of these fringes, embodiments of the disclosure are directed to the addition of an index matching passivation layer between a conductive layer of traces and an adhesive layer in the touch sensor panel stackup.

DETAILED DESCRIPTION

In the following description, reference is made to the accompanying drawings which form a part hereof, and in which it is shown by way of illustration specific embodiments that can be practiced. It is to be understood that other embodiments can be used and structural changes can be made without departing from the scope of the embodiments of this disclosure.

Embodiments of the disclosure relate to a touch sensor panel having an index matching passivation layer that can reduce the appearance of fringes on the touch sensor panel. Touch sensor panels are generally comprised of numerous layers that together form a stackup. This stackup can include a substrate layer that can be formed from either glass or plastic. Touch sensor panels with plastic substrates can be less expensive and can be made thinner than touch sensor panels with glass substrates. However, the use of a stackup with adjacent layers having mismatched refractive indices can result in the appearance of fringes. These fringes can appear on the touch sensor panel and can be visually distracting. These fringes can form when incident light hitting the mismatched interfaces interfere with each other. This interference pattern can give rise to the appearance of fringes. In order to reduce the appearance of these fringes, embodiments of the disclosure are directed to the addition of an index matching passivation layer between an ITO layer and an adhesive layer in the touch sensor panel stackup.

Figure 1A:
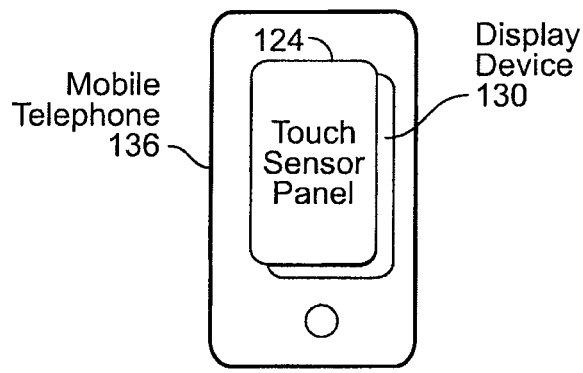
FIG. 1A illustrates an example mobile telephone according to embodiments of the disclosure.
Figure 1B:
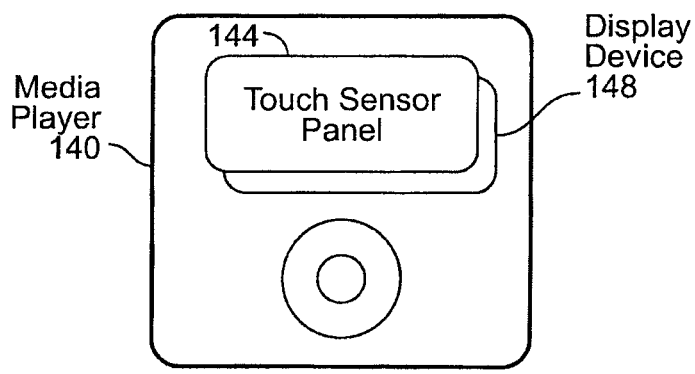
FIG. 1B illustrates an example media player according to embodiments of the disclosure.
Figure 1C:
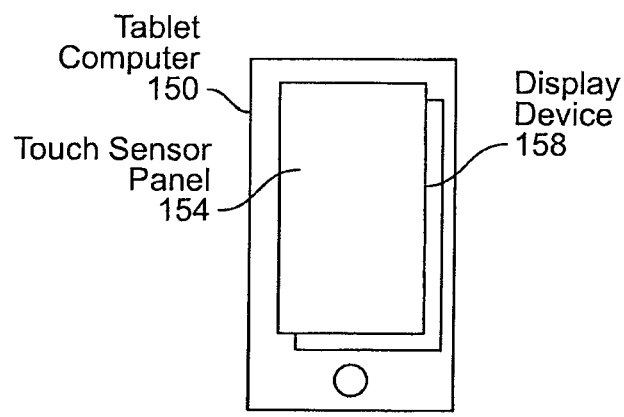
FIG. 1C illustrates an example tablet computer according to embodiments of the disclosure.

FIGS. 1A-1C show example systems in which touch sensor panels according to embodiments of the disclosure may be implemented. FIG. 1A illustrates an example mobile telephone 136 that includes a touch sensor panel 124 and display device 130. FIG. 1B illustrates an example media player 140 that includes a touch sensor panel 144 and display device 148. FIG. 1C illustrates an example tablet computer 150 that includes a touch sensor panel 154 and display device 158. In each of FIGS. 1A-1C, the display device can be disposed under the touch sensor panel. Touch sensing can be based on, for example, self capacitance or mutual capacitance, or another touch sensing technology. In some embodiments, a touch screen can be multi-touch, single touch, projection scan, full-imaging multi-touch, or any other type of capacitive touch sensing mechanism.

Figure 2:
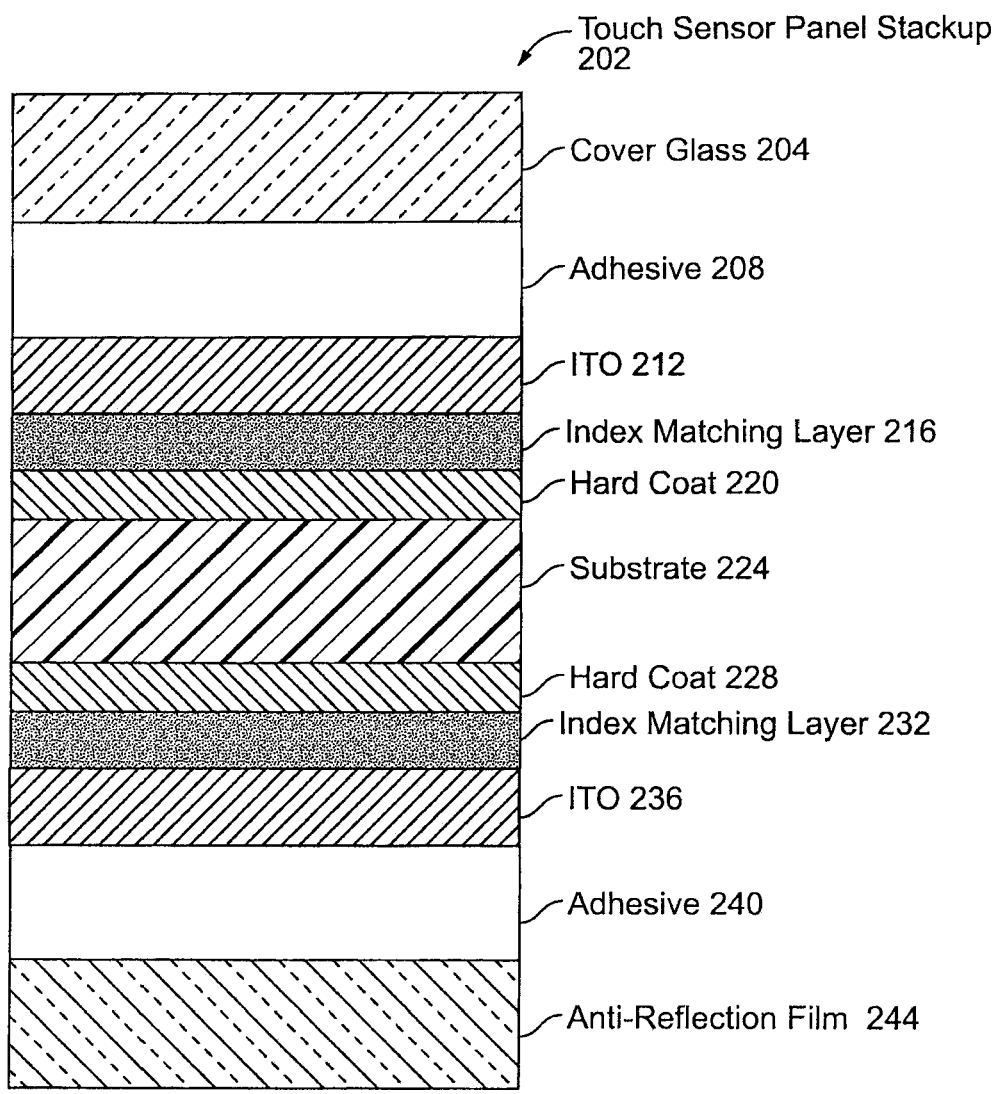
FIG. 2 illustrates an example DITO touch sensor panel stackup according to embodiments of the disclosure.

Touch sensor panels 124, 144, and 154 can be formed from Dual-sided Indium Tin Oxide (DITO) touch sensor panel stackup 202 illustrated in FIG. 2. Although FIG. 2 illustrates a DITO stackup, touch sensor panels 124, 144, and 154 can also be formed from a stackup of two substrates, each substrate having an ITO layer formed thereon (not shown). Cover glass 204 or other suitable cover material can be disposed on the top layer of stackup 202. A user can touch cover glass 204 using a finger, stylus, or other object. A touch controller (not shown) can interpret these touch events to perform various functions. Adhesive 208 can lie below cover glass 204. In an exemplary embodiment, adhesive 208 can be a pressure sensitive adhesive that adheres ITO layer 212 to cover glass 204. ITO layer 212 can be made from a substantially transparent conductive material and can include a matrix of traces (e.g., drive lines, sense lines). Index matching layer 216 can lie below ITO layer 212 and can be used to reduce the visibility of the drive lines and sense lines in the touch sensor panel. Hard coat 220 can lie below index matching layer 216 and can act as a protective barrier for substrate 224. Substrate 224 can be formed from a variety of materials including, for example, polyethylene terephthalate (PET), cyclo-olefin polymer (COP), or glass.

In the DITO stackup of FIG. 2, another hard coat 228, index matching layer 232, ITO layer 236, and adhesive 240 can be placed below substrate 224. These layers can provide the same functionality as the similarly named layers above substrate 224. Anti-reflection film 244 can be placed below adhesive 240.

Figure 3:
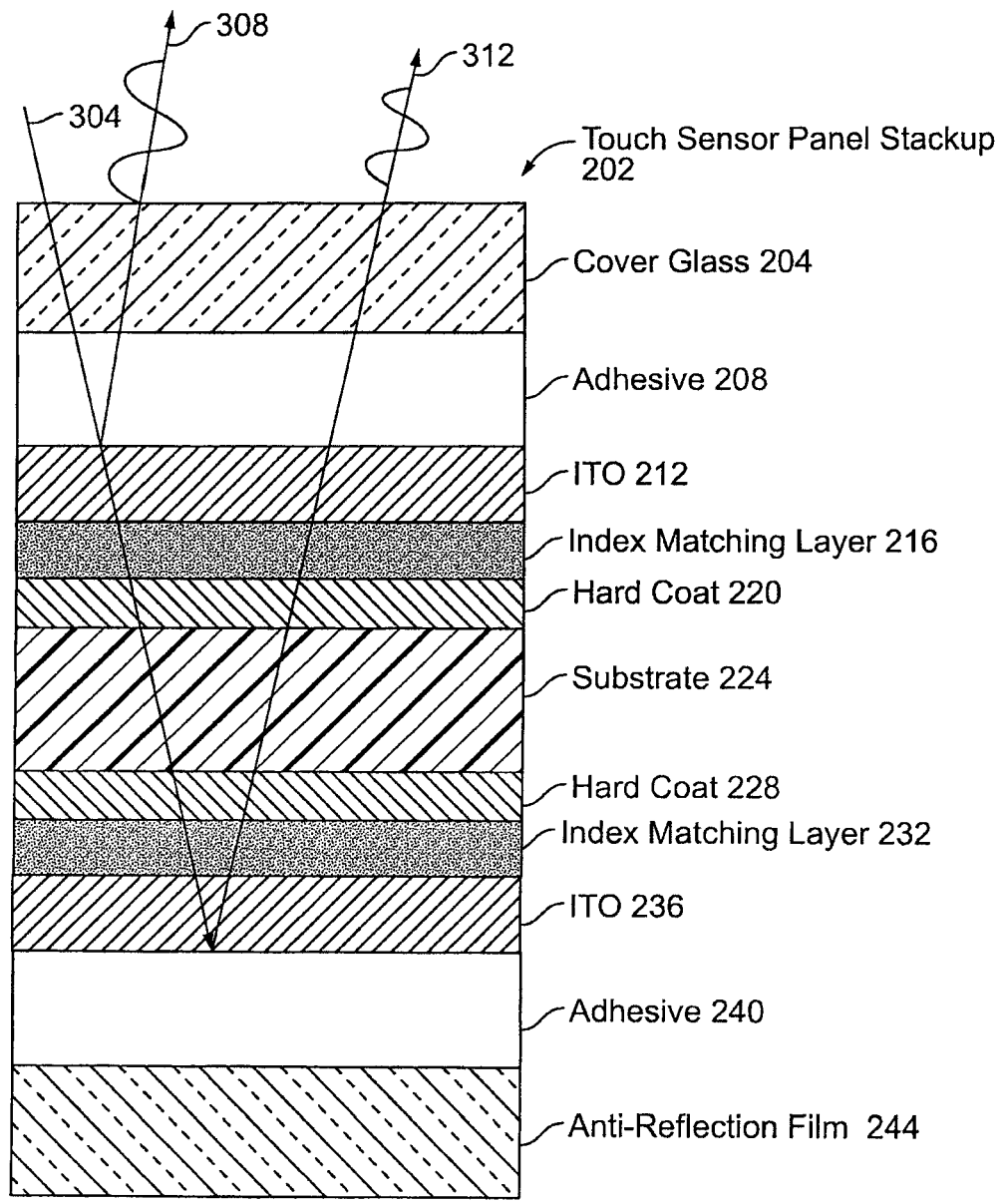
FIG. 3 illustrates the reflection of light off of two interfaces created by adjacent layers having mismatched refractive indices according to embodiments of the disclosure.

When a touch sensor panel having stackup 202 is used in a bright environment, light that reflects off the touch sensor panel can result in the appearance of fringes. FIG. 3 schematically illustrates how these fringes can form.

FIG. 3 illustrates a touch sensor panel stackup 202 that is identical to the stackup illustrated in FIG. 2. With regard to both figures, similarly numbered elements can have the same functionality. When incident light 304 hits touch sensor panel stackup 202, light can reflect off the touch sensor panel stackup as reflected rays 308 and 312. Light ray 308 can reflect off the interface between adhesive 208 and ITO 212 layer. Light ray 312 can reflect off the interface between ITO layer 236 and adhesive 240.

Figure 4:
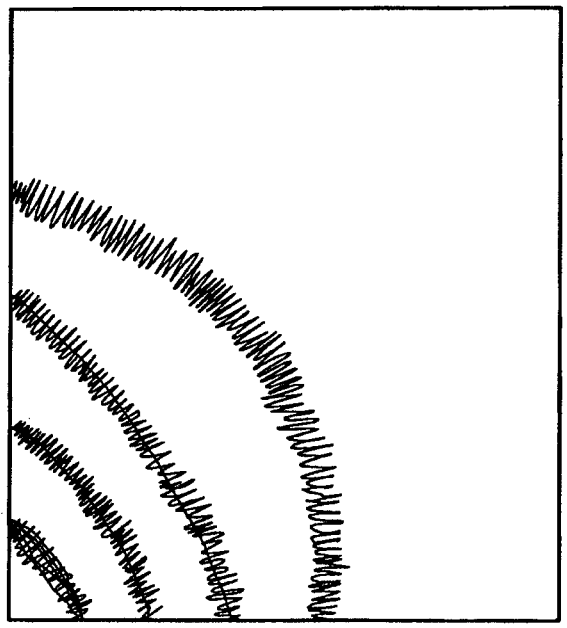
FIG. 4 illustrates a fringe pattern that can appear when light reflects off of two interfaces created by adjacent layers having mismatched refractive indices according to embodiments of the disclosure.

Due to the large difference in refractive indices, n, between the ITO layer (n approximately equal to 1.9) and adhesive (n approximately equal to 1.45-1.5) at both interfaces, reflected light rays 308 and 312 can interfere with each other to form reflectance peaks and valleys. These reflections can appear as fringes on the touch sensor panel. The severity of these fringes can vary depending on the thickness of substrate 224 and can become more apparent as this thickness decreases. Generally, these fringes become noticeable when the thickness of the substrate falls below 150 μm. These fringes can form the visual artifacts illustrated in FIG. 4.

In order to reduce the appearance of fringes, embodiments of the disclosure are directed to the insertion of an index matching passivation (IMPAS) layer between the adhesive and the ITO layer. This layer's presence can substantially reduce the amount of interference at the adhesive-ITO interface.

Figure 5:
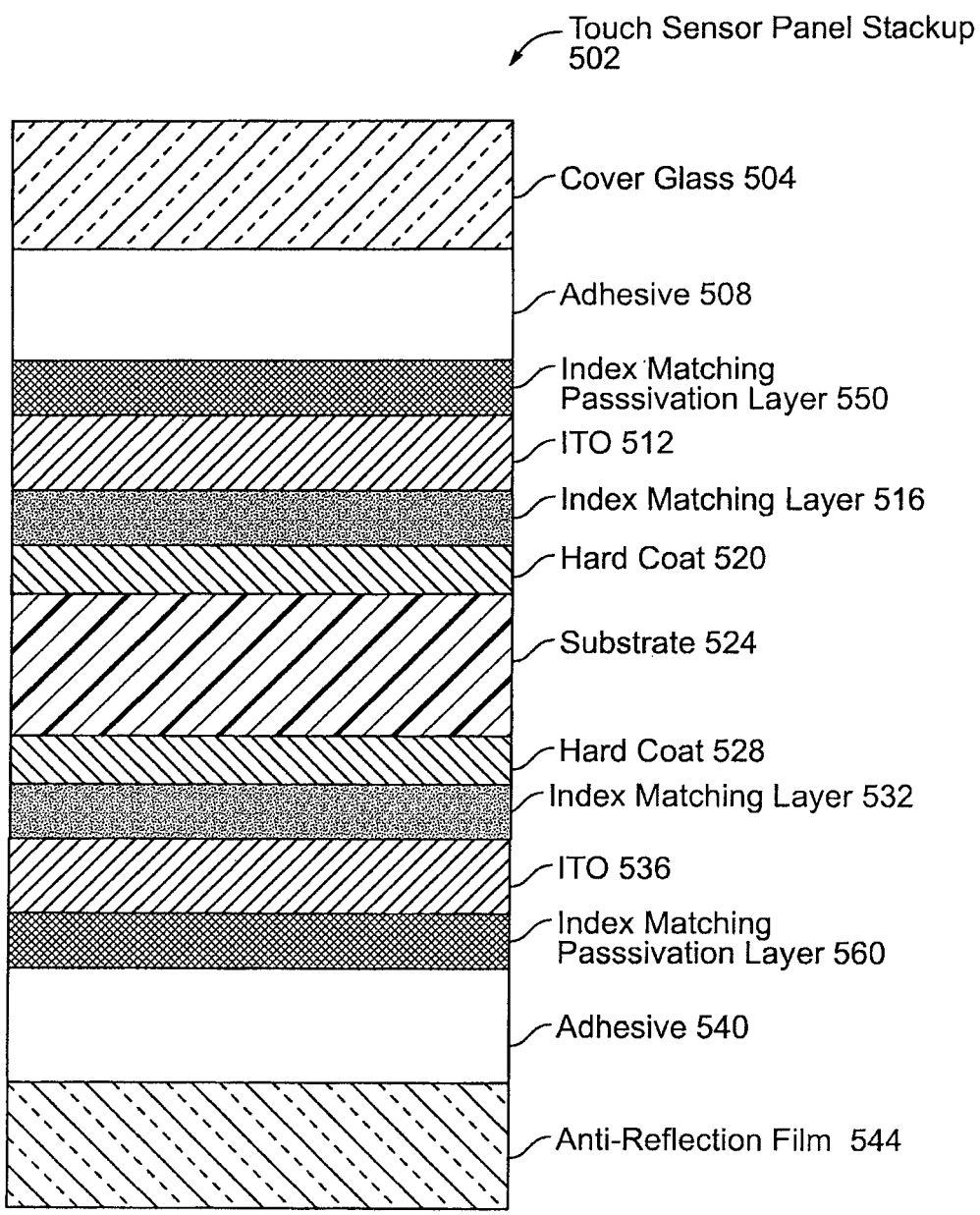
FIG. 5 illustrates an example DITO touch sensor panel stackup having an index matching passivation layer according to embodiments of the disclosure.

FIG. 5 illustrates a DITO touch sensor panel stackup 502 that has an index matching passivation layer. The configuration of stackup 502 can be similar to stackup 202. Stackup 502 can have a cover glass 504, adhesive 508 (which, in some embodiments, can be a pressure sensitive adhesive), ITO layer 512, index matching layer 516, hard coat 520, and substrate 524. With regard to FIGS. 2 and 5, similarly named layers can have the same characteristics.

Unlike stackup 202, stackup 502 has an additional index matching passivation layer 550 positioned between adhesive 508 and ITO layer 512. The presence of index matching passivation layer 550 can reduce the amount of reflection at the adhesive-ITO interface which, in turn, can reduce the interference of the reflected light and the appearance of fringes on the touch sensor panel. Although index matching passivation layer 550 is illustrated as a single layer in FIG. 5, this layer can be formed from a plurality of index matching passivation layers. In some embodiments, the total thickness of index matching passivation layer 550 can range from 2-15 μm.

In the DITO stackup of FIG. 5, another hard coat 528, index matching layer 532, ITO layer 536, and adhesive 540 can be placed below substrate 524. An additional index matching passivation layer 560 can also be placed between ITO layer 536 and adhesive 540. These layers can have the same characteristics as the similarly named layers above substrate 524. Anti-reflection film 544 can be placed below adhesive 540.

It should be noted that index matching passivation layers 550 and 560 are different from index matching layers 516 and 532. As explained above, an index matching layer can be placed between an ITO layer and hard coat in order to reduce the visibility of traces in the ITO layer. As is known in the art, the visibility of these traces can depend on the difference in reflectance between the ITO layer and the index matching layer. Whether the ITO traces are visible, however, is unrelated to the interference of reflected light as described above with respect to the appearance of fringes. Disclosed embodiments add an additional index matching layer to the adhesive-ITO layer interface to address a different problem (reflections and fringes) that is localized to a different part of the touch sensor panel stackup.

The following paragraphs describe the selection of the IMPAS layer's refractive index and the materials used to form this layer.

The refractive index of the IMPAS layer should be selected such that the appearance of fringes is reduced. This generally occurs when the reflectance at the IMPAS-adhesive interface and the reflectance at the IMPAS-ITO layer interface follow the following guidelines.

First, the percentage of reflectance at each interface should be small (i.e., <1%) for a given IMPAS layer refractive index. Second, the percentage of reflectance at both interfaces can be approximately equal to each other for a given IMPAS layer refractive index. The relative importance of these guidelines can be accorded equal or different weights. Computer simulations were performed to determine the percentage of reflectance at each interface for different IMPAS layer refractive indices. The results are shown in the following table:

TABLE 1

Simulation Results for Interface Reflectance Values.

| IMPAS Layer Refractive Index | Interface Reflectance (%) | |
| --- | --- | --- |
| | Adhesive (n = 1.45) - IMPAS Layer | IMPAS Layer - ITO Layer (n = 1.9) |
| 1.5 | 0.03 | 1.38 |
| 1.55 | 0.11 | 1.03 |
| 1.6 | 0.24 | 0.73 |
| 1.65 | 0.42 | 0.50 |

TABLE 1-continued

Simulation Results for Interface Reflectance Values.

| | Interface Reflectance (%) | |
|---|---|---|
| IMPAS Layer Refractive Index | Adhesive (n = 1.45) - IMPAS Layer | IMPAS Layer - ITO Layer (n = 1.9) |
| 1.7 | 0.63 | 0.31 |
| 1.75 | 0.88 | 0.17 |

The above simulation assumes that the refractive indices of the adhesive and the ITO layer are equal to 1.45 and 1.9, respectively. As shown in the table, increasing the refractive index of the IMPAS layer can increase the percentage of reflectance at the adhesive-IMPAS layer interface and can decrease the percentage of reflectance at the IMPAS layer-ITO layer interface. With regard to the first guideline, interface reflectance can be small (i.e., less than 1%) when the refractive index of the IMPAS layer is equal to 1.6, 1.65, 1.7, or 1.75. Given the trajectory of reflectance percentages at these discrete IMPAS layer refractive indices, a person of ordinary skill in the art would recognize that a range of refractive indices from 1.6 to 1.75 can also yield internal reflectances less than 1%. With regard to the second guideline, the interface reflectances are approximately equal to each other when the refractive index of the IMPAS layer is equal to 1.65 (i.e., compare 0.42 v. 0.50).

The above simulation results indicate that selecting a refractive index for the IMPAS layer between the refractive indices of the adhesive and the ITO layer can reduce the appearance of fringes. A refractive index of 1.65 can greatly reduce the fringe effect. A refractive index of 1.6-1.64 and 1.66-1.75 can also be helpful in reducing the appearance of fringes but may be less effective.

The material used to form the IMPAS layer can be selected based on the desired range of refractive indices. As explained above, a refractive index from 1.6-1.75 can reduce the appearance of fringes. Passivation layers are generally formed from an acrylic material which can have a refractive index of 1.5. In an exemplary embodiment, an additional material can be added to the acrylic in order to raise the refractive index of the IMPAS layer to the desired 1.6-1.75 range. Table 2 lists different materials that can be used to form the IMPAS layer and the layer's resulting refractive index.

TABLE 2

Materials Added to IMPAS Layer and Resulting Refractive Index

| Material Added to Acrylic to Form IMPAS Layer | Resulting Refractive Index (@ 633 nm) |
|---|---|
| $TiO_2$ (Rutile) | 2.72 |
| $TiO_2$ (Anatase) | 2.52 |
| ZnO | 1.95 |
| $ZrO_2$ | 1.67-1.70 |

As can be seen from Table 2, adding $ZrO_2$ to the acrylic material can result in an IMPAS layer with a refractive index of 1.67-1.70. Because the resulting refractive index falls within the desired 1.6-1.75 range, the $ZrO_2$-acrylic combination can be useful in reducing the fringe effect. Although the other materials listed in Table 2 can also be added to the IMPAS layer, these materials may not be as effective in reducing the appearance of fringes.

Figure 6:
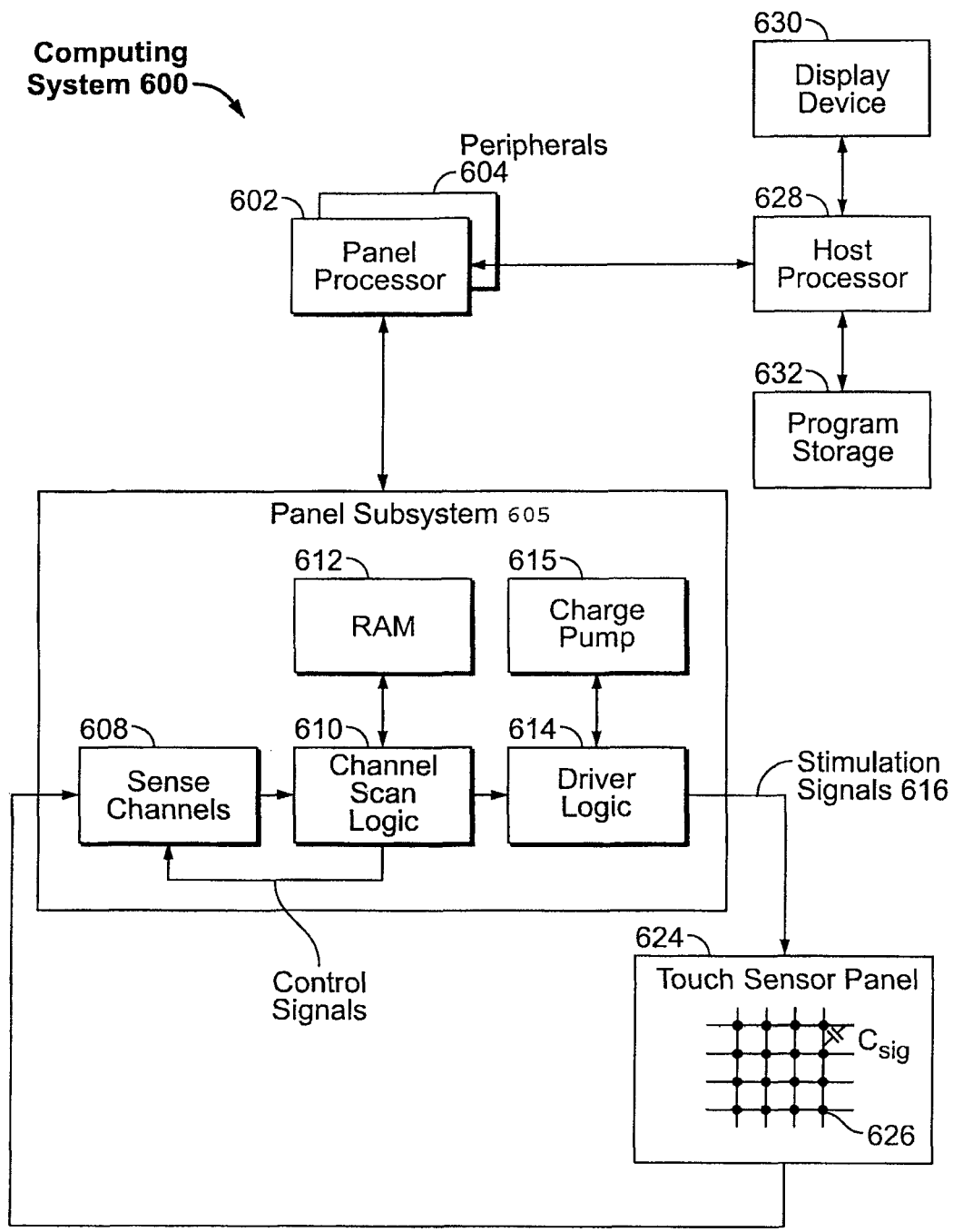
FIG. 6 illustrates an exemplary computing system utilizing a touch sensor panel stackup having an index matching passivation layer according to embodiments of the disclosure.

FIG. 6 illustrates exemplary computing system 600 that can include one or more of the embodiments described above. Computing system 600 can include one or more panel processors 602 and peripherals 604, and panel subsystem 605. Peripherals 604 can include, but are not limited to, random access memory (RAM) or other types of memory or storage, watchdog timers and the like. Panel subsystem 605 can include, but is not limited to, one or more sense channels 608, channel scan logic 610 and driver logic 614. Channel scan logic 610 can access RAM 612, autonomously read data from the sense channels and provide control for the sense channels. In addition, channel scan logic 610 can control driver logic 614 to generate stimulation signals 616 at various frequencies and phases that can be selectively applied to drive lines of touch sensor panel 624. In some embodiments, panel subsystem 605, panel processor 602 and peripherals 604 can be integrated into a single application specific integrated circuit (ASIC).

Touch sensor panel 624 can be formed from a stackup having one or more substrates. As disclosed above, this stackup can include multiple index matching passivation layers positioned between multiple adhesive and ITO layers. The index matching passivation layers can reduce the appearance of fringes that can form when light rays reflected from the ITO/adhesive interfaces interfere with each other. Touch sensor panel 624 can include a capacitive sensing medium having a plurality of drive lines and a plurality of sense lines formed on the ITO layer, although other sensing media can also be used. Each intersection of drive and sense lines can represent a capacitive sensing node and can be viewed as picture element (pixel) 626, which can be particularly useful when touch sensor panel 624 is viewed as capturing an "image" of touch. After panel subsystem 605 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel). Each sense line of touch sensor panel 624 can drive sense channel 608 (also referred to herein as an event detection and demodulation circuit) in panel subsystem 605.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A touch sensor panel stackup, comprising:
   a plurality of conductive material layers having a first refractive index;
   a plurality of adhesive layers having a second refractive index, each adhesive layer paired with a conductive material layer for adhering the conductive material layer to additional material;
   a first index matching passivation layer disposed between a first conductive material layer and a first adhesive layer, and a second index matching passivation layer disposed between a second conductive material layer and a second adhesive layer, wherein:
      the first and second index matching passivation layers, the first and second conductive material layers, and the first and second adhesive layers are separate layers,
      the first and second index matching passivation layers have a third refractive index that is between the first and second refractive indices and are disposed on a first side of each of the first and second conductive material layers, respectively; and first and second index matching layers are disposed on each of a second side of the first and second conductive material layers, respectively.

2. The touch sensor panel stackup of claim 1, wherein the third refractive index of the first and second index matching passivation layers is selected to reduce light reflected from an interface between the first conductive material layer and first adhesive layer, and also between the second conductive material layer and the second adhesive layer.

3. The touch sensor panel stackup of claim 1, wherein plurality of conductive material layers are configured as a drive line layer and a sense line layer formed on opposite sides of a substrate.

4. The touch sensor panel stackup of claim 1, wherein the touch sensor panel stackup is incorporated with a display device to form a touch screen.

5. The touch sensor panel stackup of claim 1, wherein the touch screen is incorporated into a computing device.

6. A touch sensor panel, comprising:
a first conductive layer of traces;
a first adhesive;
a first set of one or more index matching passivation layers separate from and disposed between the first adhesive and a first side of the first conductive layer of traces;
a second conductive layer of traces;
a second adhesive;
a second set of one or more index matching passivation layers separate from and disposed between the second adhesive and a first side of the second conductive layer of traces,
wherein the index matching passivation layers in the first and second sets are selected to reduce the interference of light reflected from a first interface between the first adhesive and the first conductive layer of traces and from a second interface between the second adhesive and the second conductive layer of traces; and
a set of one or more index matching layers disposed on a second side of the first and second conductive layer of traces.

7. The touch sensor panel of claim 6, wherein the one or more index matching passivation layers in the first set have a refractive index that is between the refractive indices of the first adhesive and the first conductive layer of traces, and
wherein the one or more index matching passivation layers in the second set have a refractive index that is between the refractive indices of the second adhesive and the second conductive layer of traces.

8. The touch sensor panel of claim 7, wherein the one or more index matching passivation layers in the first and second sets have a refractive index from 1.6 to 1.75.

9. The touch sensor panel of claim 6, wherein the one or more index matching passivation layers in the first and second sets are made from acrylic and an additive, the additive selected from a group consisting of rutile, anatase, ZnO, and $ZrO_2$.

10. The touch sensor panel of claim 6, wherein each of the first and second sets of one or more index matching passivation layers has a combined thickness of 2-15 μm.

11. The touch sensor panel of claim 6, wherein the first and second conductive layer of traces are made from Indium Tin Oxide.

12. The touch sensor panel of claim 6, wherein the first and second adhesives are a pressure sensitive adhesive.

13. The touch sensor panel of claim 6, wherein the touch sensor panel is incorporated with a computing system.

14. A touch sensor panel, comprising:
a first conductive layer of traces;
a first adhesive;
a first set of one or more index matching passivation layers separate from and disposed between the first adhesive and a first side of the first conductive layer of traces;
a second conductive layer of traces;
a second adhesive;
a second set of one or more index matching passivation layers separate from and disposed between the second adhesive and a first side of the second conductive layer of traces,
wherein the index matching passivation layers in the first set reduces a percentage of light reflectance at a first interface between the index matching passivation layers in the first set and the first adhesive and at a second interface between the index matching passivation layers in the first set and the first conductive layer of traces, and
wherein the index matching passivation layers in the second set reduces a percentage of light reflectance at a third interface between the index matching passivation layers in the second set and the second adhesive and at a fourth interface between the index matching passivation layers in the second set and the second conductive layer of traces; and
a set of one or more index matching layers disposed on a second side of the first and second conductive layer of traces.

15. The touch sensor panel of claim 14, wherein the percentage of light reflectance at the first interface is approximately equal to the percentage of light reflectance at the second interface, and
wherein the percentage of light reflectance at the third interface is approximately equal to the percentage of light reflectance at the fourth interface.

16. The touch sensor panel of claim 14, wherein the percentage of light reflectance at each of the first, second, third, and fourth interfaces is less than 1%.

17. A method of reducing the appearance of fringes on a touch sensor panel having a first and second conductive layer of traces, a first and second adhesive, and a first and second index matching layer, the method comprising:
forming a first and second set of one or more index matching passivation layers, the first and second sets of one or more index matching passivation layers separate from the first and second conductive layers of traces, the first and second adhesive, and the first and second index matching layer;
disposing the first set of index matching passivation layers between the first conductive layer of traces and the first adhesive;
disposing the second set of index matching passivation layers between the second conductive layer of traces and the second adhesive; and
using the first and second sets of index matching passivation layers to reduce the interference of light reflected from a first interface between the first adhesive and the first conductive layer of traces and from a second interface between the second adhesive and the second conductive layer of traces.

18. The method of claim 17, further comprising:
selecting a refractive index for the index matching passivation layers in the first set that is between the refractive indices of the first adhesive and the first conductive layer of traces; and selecting a refractive index for the index matching passivation layers in the second set that is between the refractive indices of the second adhesive and the second conductive layer of traces.

19. The method of claim 18, wherein the index matching passivation layers in the first and second sets have a refractive index from 1.6 to 1.75.

20. The method of claim 17, further comprising forming the index matching passivation layers in the first and second sets from acrylic and an additive, the additive selected from a group consisting of rutile, anatase, ZnO, and $ZrO_2$.

21. A method of reducing the appearance of fringes on a touch sensor panel having a first and second conductive layer of traces, a first and second adhesive, and a first and second index matching layer, the method comprising:

forming a first and second set of one or more index matching passivation layers, the first and second sets of one or more index matching passivation layers separate from the first and second conductive layers of traces, the first and second adhesive, and the first and second index matching layer;

disposing the first set of index matching passivation layers between the first conductive layer of traces and the first adhesive;

disposing the second set of index matching passivation layers between the second conductive layer of traces and the second adhesive;

using the index matching passivation layers in the first set to reduce a percentage of light reflectance at a first interface between the index matching passivation layers in the first set and the first adhesive and at a second interface between the index matching passivation layers in the first set and the first conductive layer of traces; and using the index matching passivation layers in the second set to reduce a percentage of light reflectance at a third interface between the index matching passivation layers in the second set and the second adhesive and at a fourth interface between the index matching passivation layers in the second set and the second conductive layer of traces.

22. The method of claim 21, wherein the percentage of light reflectance at the first interface is approximately equal to the percentage of light reflectance at the second interface, and wherein the percentage of light reflectance at the third interface is approximately equal to the percentage of light reflectance at the fourth interface.

23. The method of claim 21, wherein the percentage of light reflectance at each of the first, second, third, and fourth interfaces is less than 1%.

* * * * *